United States Patent
Larson et al.

(10) Patent No.: US 7,861,042 B2
(45) Date of Patent: Dec. 28, 2010

(54) PROCESSOR ACQUISITION OF OWNERSHIP OF ACCESS COORDINATOR FOR SHARED RESOURCE

(75) Inventors: Douglas V. Larson, Santa Clara, CA (US); Robert Johnson, Santa Cruz, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 11/552,103

(22) Filed: Oct. 23, 2006

(65) Prior Publication Data

US 2008/0098180 A1    Apr. 24, 2008

(51) Int. Cl.
- G06F 12/00 (2006.01)
- G06F 3/00 (2006.01)
- G06F 13/00 (2006.01)
- G06F 11/00 (2006.01)
- G06F 9/46 (2006.01)

(52) U.S. Cl. .................. 711/152; 710/36; 710/37; 710/38; 710/39; 710/107; 710/108; 710/109; 711/154; 711/156; 714/2; 714/25; 718/102; 718/103

(58) Field of Classification Search ........... 711/152, 711/154, 156; 718/102, 103; 710/240, 36, 710/37, 38, 107–125; 706/10; 714/2, 25
See application file for complete search history.

(56) References Cited

U.S. PATENT DOCUMENTS

| | | | |
|---|---|---|---|
| 4,896,257 A | 1/1990 | Ikeda et al. | |
| 5,790,813 A | 8/1998 | Whittaker | |
| 5,829,033 A * | 10/1998 | Hagersten et al. | ........... 711/141 |
| 5,911,052 A * | 6/1999 | Singhal et al. | ............. 710/113 |
| 5,966,543 A | 10/1999 | Hartner et al. | |
| 5,978,874 A * | 11/1999 | Singhal et al. | ............. 710/107 |
| 5,987,549 A * | 11/1999 | Hagersten et al. | ........... 710/107 |
| 6,047,316 A | 4/2000 | Barton et al. | |
| 6,173,442 B1 | 1/2001 | Agesen et al. | |
| 6,453,354 B1 | 9/2002 | Jiang et al. | |
| 6,567,873 B1 * | 5/2003 | Henriksen | ................... 710/240 |
| 6,782,440 B2 | 8/2004 | Miller | |
| 6,886,162 B1 * | 4/2005 | McKenney | ................... 718/102 |
| 6,973,455 B1 | 12/2005 | Vahalia et al. | |
| 7,051,026 B2 | 5/2006 | Berry et al. | |
| 7,058,948 B2 | 6/2006 | Hoyle | |
| 7,062,615 B2 | 6/2006 | Miller et al. | |
| 7,069,330 B1 | 6/2006 | McArdle et al. | |
| 7,069,560 B1 | 6/2006 | Cheyer et al. | |
| 7,076,624 B2 | 7/2006 | Shaath et al. | |

(Continued)

OTHER PUBLICATIONS

2006 Dijkstra Prize, pp. 1-12, Jul. 25, 2006, http://www.cs.rochester.edu/~scott/professional/Dijkstra/presentation.html.

(Continued)

Primary Examiner—Kevin L Ellis
Assistant Examiner—Mehdi Namazi

(57) ABSTRACT

A processor of an apparatus in an example upon a failure of an earlier attempt to directly acquire ownership of an access coordinator for a resource shared with one or more additional processors, locally determines an amount to delay a later attempt to directly acquire ownership of the access coordinator. Upon a failure of the later and/or a subsequent attempt to directly acquire ownership of the access coordinator the processor would enter into an indirect waiting arrangement for ownership of the access coordinator.

23 Claims, 4 Drawing Sheets

U.S. PATENT DOCUMENTS

| | | |
|---|---|---|
| 7,080,143 B2 | 7/2006 | Hunt et al. |
| 2001/0014905 A1 | 8/2001 | Onodera |
| 2003/0200457 A1 | 10/2003 | Auslander |
| 2005/0144330 A1 | 6/2005 | Richardson |
| 2005/0166018 A1 | 7/2005 | Miki |
| 2008/0010408 A1* | 1/2008 | Shen et al. .................. 711/118 |

OTHER PUBLICATIONS

Definition of "Central Processing Unit" from Wikipedia.com.
M.M. Michael et al., "Concurrent Update on Multiprogrammed Shared Memory Multiprocessors," Apr. 1996, pp. 1-15.
Definition of "CPU cache" from Wikipedia.com.
Definition of "Heuristic" from Dictionary.com.
Definition of "Lock (computer science)" from Wikipedia.com.
E.A. Brewer et al., "Lottery Scheduling Scheduler Activations," Oct. 21, 2004, pp. 1-5.
Benjie Chen, "Multiprocessing with the Exokernel Operating System," Feb. 2000, pp. 1-59.
Definition of "Mutual exclusion," from Wikipedia.com.
p. 1 citation info PVM A Framework for Parallel Distributed Computing.
p. 1 citation info SunOS Multi-thread Architecture.pdf.
Definition of "Page fault," from Wikipedia.com.
Patch Name PHNE_34138, pp. 1-8.
V.S. Sunderam, "PVM: A Framework for Parallel Distributed Computing," pp. 1-27.
M.M. Michael et al., "Simple, Fast, and Practical Non-Blocking and Blocking Concurrent Queue Algorithms," 9 pages.
R. Rajwar, "Speculation-Based Techniques for Transactional Lock-Free Execution of Lock-Based Programs," 2002, pp. 1-209.
Definition of "Spinlock" from Wikipedia.com.
M.L.Powell et al., "SunOS Multi-thread Architecture," pp. 1-14.

* cited by examiner

PROCESSOR ACQUISITION OF OWNERSHIP OF ACCESS COORDINATOR FOR SHARED RESOURCE

BACKGROUND

Multithreaded computer programs and/or multiprocessor computer systems have multiple threads and/or processors that share use of a number of resources. Access coordination and/or synchronization serve to organize access by a plurality of the processors to one or more of the shared resources. A tool for access coordination and/or synchronization comprises a lock, for example, a spinlock.

A computer architecture employs a ticket-serving algorithm to implement spinlocks. Each lock comprises both a ticket variable and a serving value variable, which indicates the ticket value currently being served. For example, these variables initially comprise a same value, indicating that the particular lock is available.

Each processor that desires the lock takes the next available ticket. When a processor takes a ticket, the processor increments the value of the next available ticket. If the ticket value taken matches the serving value, then the processor owns the spinlock. If the ticket value is greater than the serving value, then the processor waits for a turn on the spinlock.

DESCRIPTION OF THE DRAWINGS

Features of exemplary implementations of the invention will become apparent from the description, the claims, and the accompanying drawings in which:

DETAILED DESCRIPTION

Figure 1:
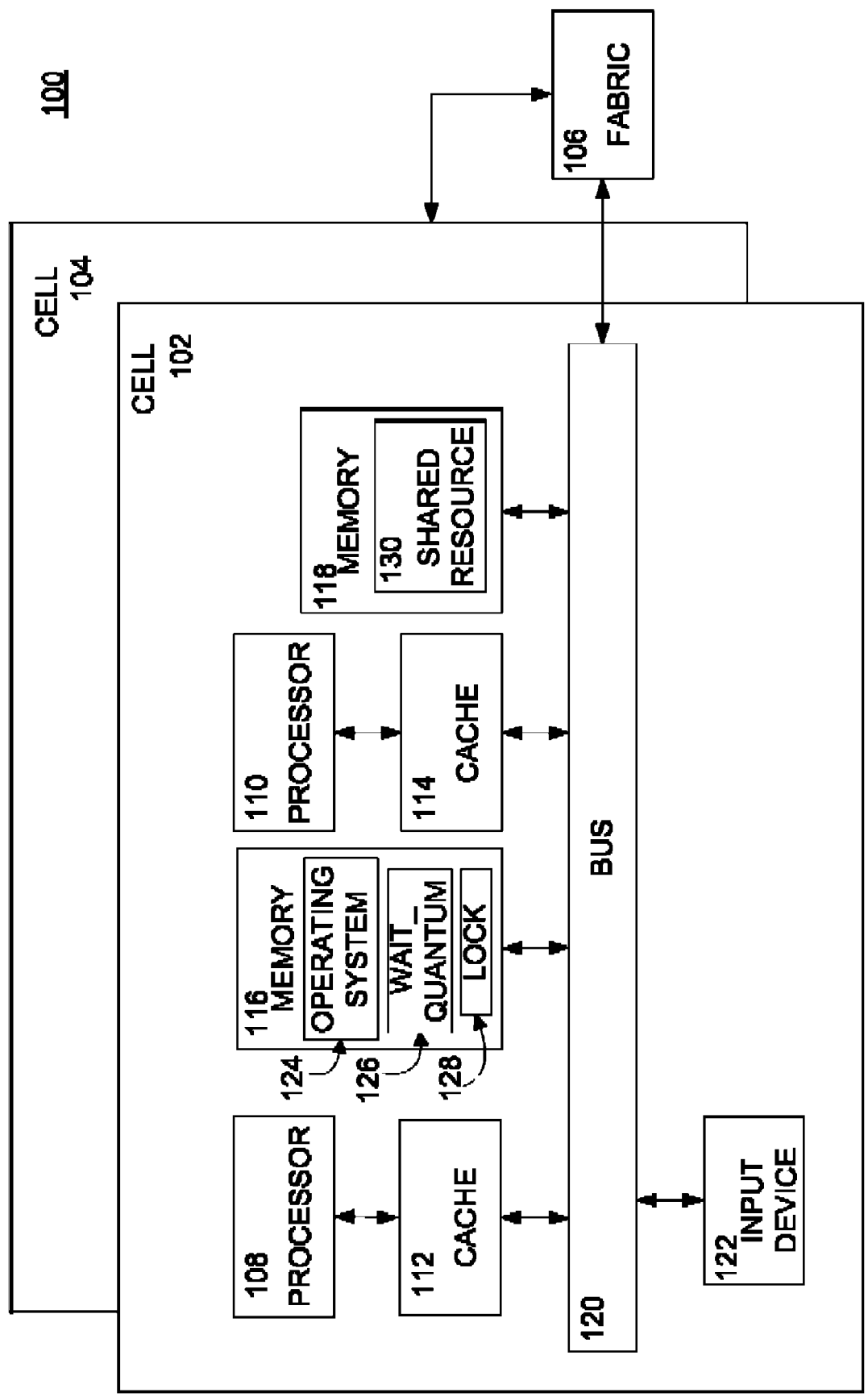
FIG. 1 is a representation of an implementation of an apparatus that comprises a plurality of cells and one or more memory locations and/or fabrics according to a preferred embodiment of the invention.

Referring to the BACKGROUND section above, waiting for the lock causes cache misses for the waiting processors. The cache misses in turn cause bus contention. The waiting for the lock and missing of their caches by the processors each time the lock is released or looked at causes a slowdown in the system. An exemplary study of a thirty-two processor system determined that this cache missing causes a seven percent reduction in performance. Greater numbers of processors are expected to experience even worse performance reductions from this cache missing.

Exemplary multiprocessor systems comprise thirty-two or sixty-four logical processors. Many or all of the processors in an example contend on a same memory fabric in the computer system, such as when sharing access to resources. An access coordinator such as a lock in an example serves to protect, coordinate, and/or synchronize access to a shared resource. Different kinds of locks in an example serve to protect, coordinate, and/or synchronize access to a variety of shared resources. Exemplary locks that involve a processor spinning and/or waiting comprise one or more of spinlocks, read/write spinlocks, read/write blocking locks, adaptive locks, mutexes (mutual exclusion negotiators), condition variables, and semaphores.

Exemplary spinlock synchronization and/or access coordination in a multiprocessor system employs prearbitration to organize the computer processors in such a way as to have each processor interrogate a separate cache line and thus not interfere with each other. The system does incur an expense of cache missing by the processors during the setup of the prearbitration, to arrange for coordination of the processors. The bus traffic from the cache misses during the prearbitration setup reduces performance. As contention by the processors for the lock increases, the number of cache misses increases. This, in turn, reduces the efficiency of the lock, and increases bus contention. This feedback property makes overhead associated with the lock reach ever higher levels with increased bus contention.

The efforts involved in synchronization and/or access coordination of processes in computer systems may entail an expense in terms of making some percentage of the system unproductive for some time. The capabilities of the system for production of useful work may be increased through reduction of overhead associated with synchronization and/or access coordination. Computing power may be consumed in cache faults associated with the accessing of the memory used for the lock and/or access coordinator. Bus contention may cause system performance problems. For example, cumulative cache faults in the spinlock code may result in a loss of overall system performance of several percent. This loss of performance in an example may reduce the value of very expensive, very large computer systems.

System performance may be significantly impacted by delays in the acquisition of an access coordinator. When a particular spinlock in an example is under high contention and the average hold time of the spinlock is short, a small amount of additional latency in acquiring the lock can exacerbate the lock and/or bus contention. It may be desirable to reduce the latency of acquiring an access coordinator. It may be desirable to reduce processor utilization associated with access coordinators, and promote greater system throughput. It may be desirable to reduce cache misses that cause delays in retrieving the memory associated with the access coordinator, and reduce bus contention.

Turning to FIG. 1, an implementation of an apparatus 100 in an example comprises a plurality of cells and one or more memory locations and/or fabrics. The apparatus 100 in an example comprises one or more of a computing system, a multithreaded program computer system, and/or a multiprocessor computer system. The plurality of cells of the computing system as the apparatus 100 in an example comprises cells 102 and 104. An exemplary memory fabric comprises memory fabric 106. The memory fabric 106 in an example comprises one or more connections among and/or contents of shared memory resources of the cells 102 and 104.

The cell 102 in an example comprises a plurality of processors, a plurality of memories, one or more buses, and/or one or more input devices. Exemplary processors comprise corresponding and/or respective processor cores and/or hardware threads, for example, where one or more hardware threads may run on one physical processor core. Exemplary processors comprise processors 108 and 110 with respective caches 112 and 114. The processors 108 and 110 in an example share main memories 116 and 118. The caches 112 and 114 comprise exemplary fast speed memories and the main memories 116 and 118 comprise exemplary moderate speed memories of the plurality of memories of the cell 102.

An exemplary bus comprises bus 120. An exemplary input device comprises input device 122. The bus 120 in an example serves to couple the memory fabric 106, the caches 112, 114, the main memories 116, 118, and the input device 122. The exemplary memory fabric 106 in an example serves to couple the bus 120 in cell 102 with one or more similar and/or analogous buses in one or more additional cells 104, for example, to connect and/or couple exemplary main memories 116, 118 with one or more similar and/or analogous main memories in one or more additional cells 104.

The main memories 116, 118 in the exemplary cell 102 in an example comprise and/or store objects, for example, an operating system 124, wait_quanta 126 associated with a plurality, most, all, and/or each of the processors 108 and 110, one or more access coordinators and/or locks 128, and one or more shared resources 130. The cell 104 in an example comprises analogous instances of the main memories 116, 118 that comprise analogous instances of the wait_quanta 126, the access coordinators and/or locks 128, and the shared resources 130. In one or more exemplary implementations, one or more features described herein in connection with one or more of the cells 102 and/or 104 and/or one or more parts thereof apply and/or are extendible analogously to the other and/or one or more other instances of cells in the apparatus 100. In one or more exemplary implementations, one or more features described herein in connection with one or more of the processors 108 and/or 110 and/or one or more parts thereof apply and/or are extendible analogously to the other and/or one or more other instances of processors in the apparatus 100. In one or more exemplary implementations, one or more features described herein in connection with one or more of the main memories 116 and/or 118 and/or one or more parts thereof apply and/or are extendible analogously to the other and/or one or more other instances of main memories in the apparatus 100.

An exemplary operating system 124 views all of main memory 116, 118 as a single, continuous range of memory locations, even though parts of the memory may be associated with different processors 108, 110 and/or even different cells 102, 104. The operating system 124 in an example may be spread across memory locations in the memory associated with every processor 108, 110 and/or every cell 102, 104.

In a further example, the operating system 124 is aware of the difference in access times between accesses to memory within the cell 102 and access to a different cell 104. Certain structures may be allocated in the cell 102 as an exemplary local cell, for example, to benefit from the reduced latency and/or access delay. The memory of the local cell in an example comprises Cell Local Memory (CLM). The memory of the non-local cell in an example comprises Interleaved Memory (ILM). An exemplary implementation puts the wait_quanta 126 in the CLM, for example, to benefit from the reduced latency and/or access delay. Another exemplary implementation puts the wait_quanta 126 in the ILM. The shared resources 130 and/or locks 128 in an example may be stored in either CLM or ILM.

Figure 2:
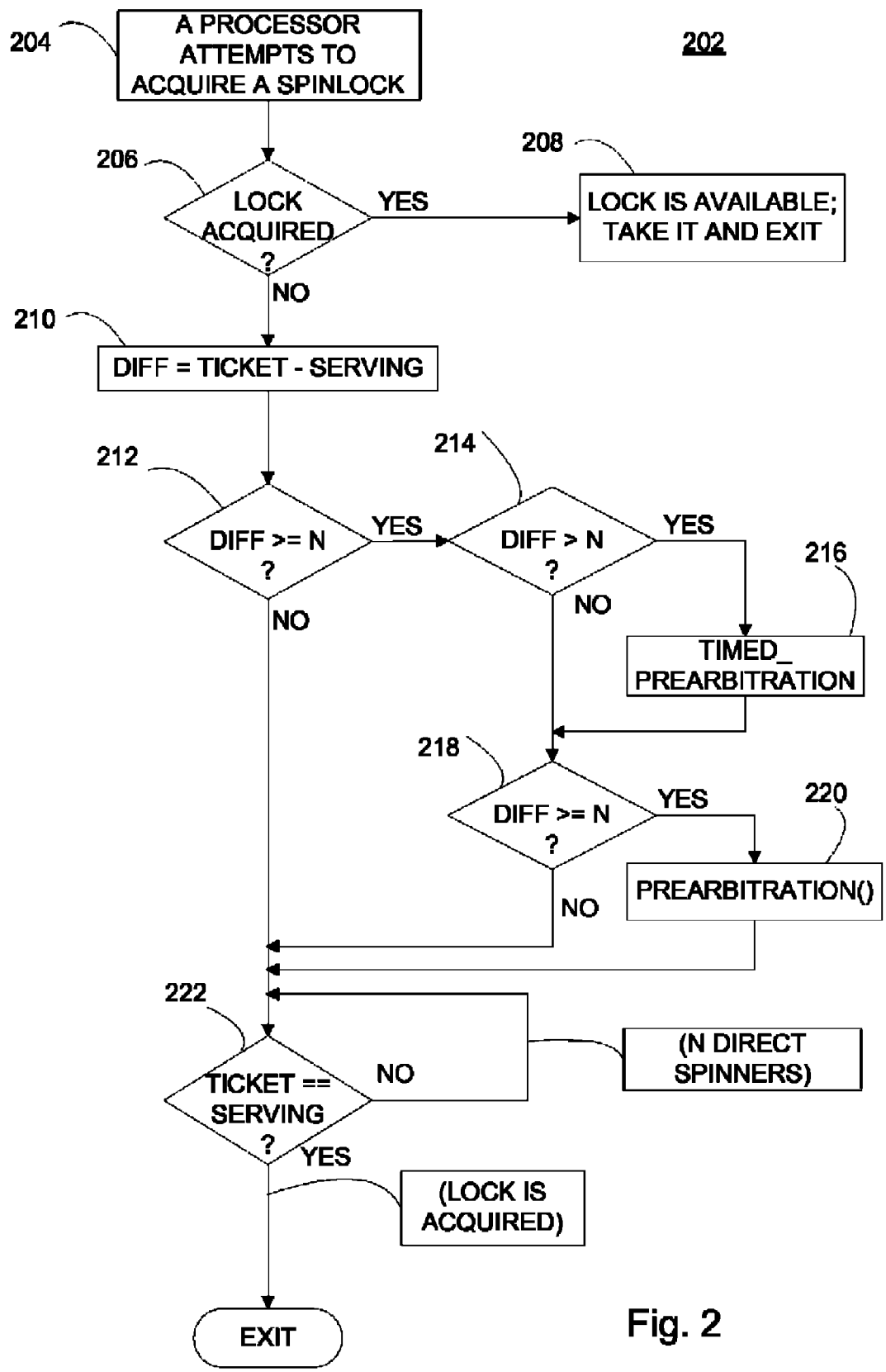
FIG. 2 is a representation of an exemplary logic flow stored and/or implemented at a main memory and performed and/or executed by an operating system of an implementation of the apparatus of FIG. 1.
Figure 3:
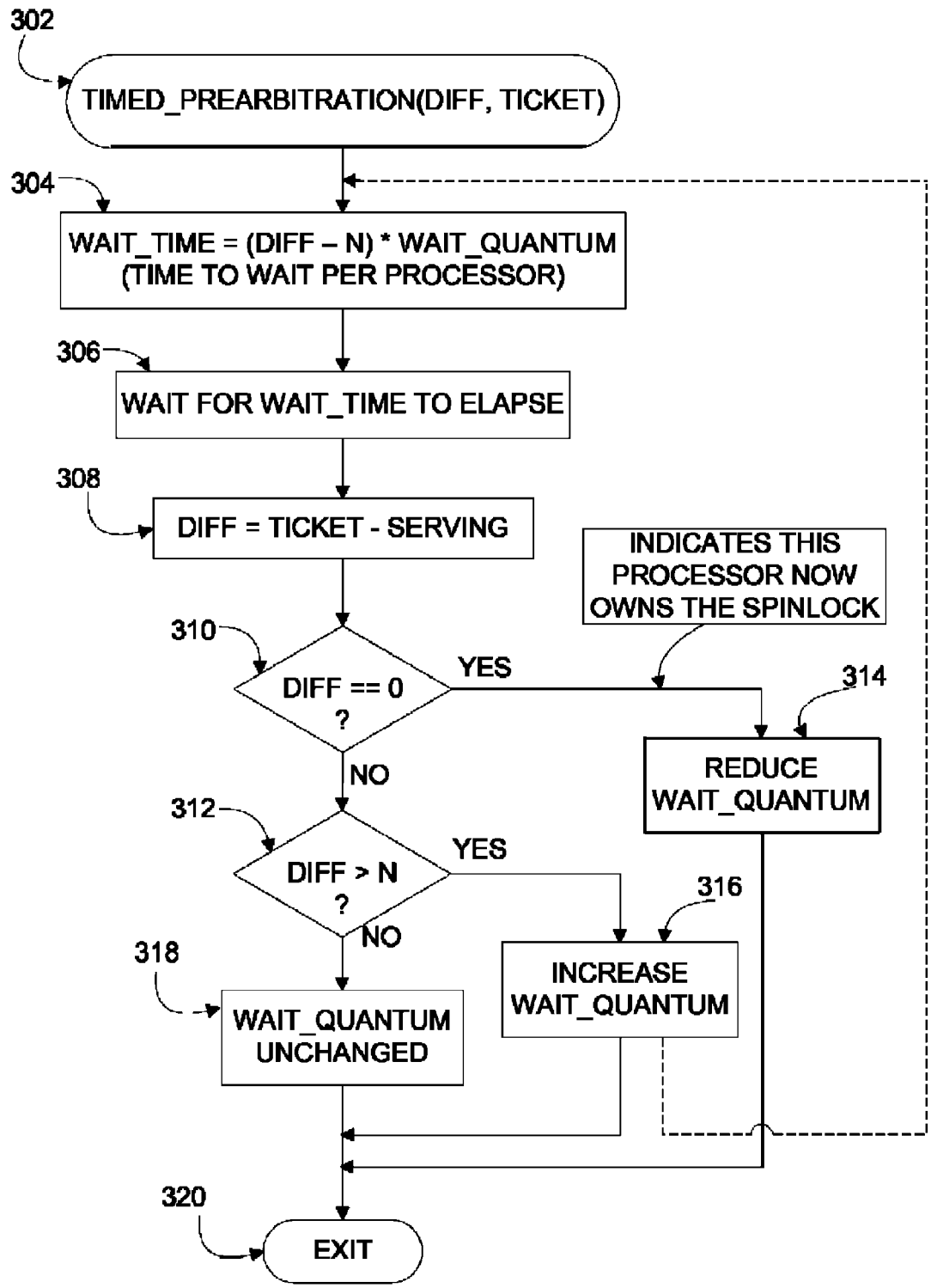
FIG. 3 is a representation an exemplary implementation of timed prearbitration as part of the exemplary logic flow of FIG. 2.

Exemplary processors 108 and 110 execute instructions from a single exemplary operating system 124, or from a plurality of operating systems. The operating system 124 in an example employs an exemplary lock 128 to coordinate access to an exemplary shared resource 130. In an exemplary implementation, a single operating system 124 resides in memory from all memory banks in all cells 102, 104. The operating system 124 in an example employs an exemplary wait_quantum 126 for a particular processor 108 or 110 to implement timed prearbitration, for example, timed_preArbitration at STEP 216 (FIGS. 2 and 3). An exemplary operating system 124 comprises timed prearbitration such as timed_preArbitration of STEP 216. An exemplary implementation with a plurality of operating systems 124 comprises an environment in which the hardware has been divided into distinct partitions. Multiple operating systems 124 in an example need not necessarily fall on boundaries of the cells 102, 104. An exemplary implementation with separate operating systems 124 may employ a timed prearbitration algorithm and/or approach such as timed_preArbitration at STEP 216, for example, on the locks 128 that are shared among the operating systems 124.

Exemplary shared resources 130 comprise data structures, memory file systems, disks, displays, other I/O (input/output devices), memory, memory controllers, network controllers, measurement counters, busses, and system resources. For example, the shared resource 130 comprises any item in the apparatus 100 that is and/or must be referenced and/or modified by multiple processors 108, 110. The shared resource 130 may be shared among processors on different cells 102 and 104, with the lock 128 controlling the access by processors on different cells 102 and 104.

Exemplary logic flow 202 in an example applies to an individual processor 108 or 110 desirous of obtaining an individual lock 128, as described herein. Exemplary access coordinators and/or locks 128 comprise one or more of spinlocks, read/write spinlocks, read/write blocking locks, adaptive locks, mutexes, condition variables, and semaphores. The description herein is extendible and/or applies analogously to each processor, a subset of processors, and/or most processors of a plurality of processors 108, 110 and/or to each lock, a subset of locks, and/or most locks of a plurality and/or variety of locks 128 in a number, variety, and/or ranges of exemplary implementations of the apparatus 100, as will be appreciated by those skilled in the art.

An exemplary consideration is the path that data takes between various types of memory and the processor that references it. As the path to the data becomes longer, the time required to reference it becomes longer. Exemplary fast references are from a processor (e.g., processor 108) to the cache (e.g., cache 112) nearest that processor. If the data requested is not in the local cache it is called a cache miss. A cache miss that is satisfied in the block of memory (e.g., main memory 116) nearest the processor is less expensive in terms of delay in retrieving the data than references to other blocks of memory (e.g., main memory 118). Longer still is the delay in retrieving data from other cells (e.g., cell 104) in the computing system as the apparatus 100.

An illustrative description of an exemplary operation of an implementation of the computing system as the apparatus 100 is presented, for explanatory purposes. Turning to FIG. 2, the operating system 124 in an example comprises and/or implements logic flow 202 that is stored in one or more exemplary main memories 116, 118 and executed by one or more exemplary processors 108, 110. Each processor 108, 110 and/or analogous other processors in an example may simultaneously, contemporaneously, and/or concurrently execute the logic flow 202. In a further example, the processors 108 and 110 may at times execute the logic flow 202 in overlapping fashion and at other times execute the flow 202 in non-overlapping fashion.

At STEP 204, a processor 108 or 110 in an example makes an initial attempt to acquire a spinlock as an exemplary access coordinator and/or lock 128. STEP 204 in an example causes the processor to acquire a ticket (e.g., a number) while, at the same time, incrementing the next ticket value, for example, in an exemplary implementation of a ticket-serving algorithm, procedure, program, mechanism, application, code, and/or logic. If the ticket received matches the serving value for the spinlock, the processor in an example becomes the owner of the spinlock and exits at STEP 208.

If the lock is not immediately available, the processor in an example proceeds to wait for the spinlock at STEP 210. An exemplary difference between the ticket value received by the processor and the serving value, referred to as "diff" in the exemplary logic flow 202, indicates how far back in line the processor is in the list of processors waiting for the lock. The processor in an example makes a determination of this difference at STEP 212. At STEP 212, if the difference is larger than or equal to a selectable and/or configurable number (N) of direct spinners for the plurality of processors, then the processor in an example proceeds to STEP 214. At STEP 214, if the difference is larger than N the processor in an example proceeds to exemplary timed prearbitration, for example, timed_preArbitration at STEP 216, as described herein. The configurable number N in an example represents a desired number and/or limit on the number of direct spinners of the plurality of processors. At STEP 214, if the difference is not larger than N, the processor in an example proceeds to STEP 218 where the processor in an example makes a determination to perform exemplary prearbitration, for example, preArbitration at STEP 220, if the difference is greater than or equal to N. Exemplary preArbitration at STEP 220 organizes the processors in such a way as to have each processor interrogate a separate cache line and thus not interfere with each other. An exemplary cache line comprises a datum, a smallest increment of memory transferred to and from a memory cache, and/or an information size larger than a usual access requested by a processor instruction. For example, the cache line is typically larger than one memory "word." The prearbitration at STEP 220 in an example arranges for the processors to access memory that will not fall on the same cache line as another processor, for example, to avoid two or more processors referencing different words in the same cache line and interfering with each other. For example, the prearbitration arranges all processors on all the cells. A further exemplary prearbitration arranges limited sets of processors selected from different cells. Exemplary partitions may serve to qualify selected processors from selected cells.

FIG. 3 presents an exemplary implementation of timed_preArbitration as STEP 216. STEP 216 in an example delays the processor from progressing to a next STEP 218 of acquiring the spinlock in the logic flow 202 (FIG. 2) by an amount of time proportional to the number of processors in front of this particular processor queued and/or lined up waiting for the spinlock. STEP 302 as an exemplary entry to STEP 216 in an example provides and/or passes two values as parameters. The first value in an example comprises the original difference value, for example, the difference between the ticket and serving values. The second value in an example comprises the ticket value for the particular processor. Upon eventual exit at STEP 320 from the procedure and/or STEP 216 as the timed_preArbitration, the return value in an example comprises the then-current difference between the ticket and serving values.

STEP 304 in an example makes a determination of the wait_time as an arithmetic progression by taking the difference between ticket and serving values (e.g., expressed as the passed parameter, diff) and multiplying the difference by an amount of time (e.g., expressed as wait_quantum 126 for the particular processor 108 or 110). Other exemplary implementations of STEP 304 may employ other and/or non-linear algorithms to calculate the wait_time. An exemplary calculation employs a factor to increase or decrease the wait_time, for example, in connection with larger values of "diff" (difference between the ticket received by the processor and the serving value). On systems with more than one hardware thread per physical processor core, which may be referred to as hyper-threaded systems, the processor executing the timed_preArbitration of STEP 216 in an example voluntarily transfers control to another hardware thread on the same processor core, for example, instead of waiting for time to elapse.

At STEP 306, the processor in an example checks the clock until this wait_time amount has elapsed. Upon the time elapsing, the processor at STEP 308 in an example makes a determination of the new distance between ticket and serving values and may adjust and/or adapt the wait_quantum 126 for the processor based on the result. Exemplary adjustment and/or adaptation of the wait_quantum 126 may employ a heuristic. An exemplary heuristic employs intelligence to make desirable, acceptable, and/or good choices. An exemplary adaptation changes future behavior based on past experience.

An exemplary desirable result is the distance to the front of the line is now in the range of one to N, where N is the configurable number of direct spinners. In this case in an example, no adjustment to the wait_quantum 126 is required and the processor will proceed through STEPS 310, 312, and 318 to the next STEP 218 of acquiring the spinlock in the exemplary logic flow 202.

If instead the difference between ticket and serving values is zero at STEP 310, then the current processor in an example is actually the owner of the spinlock. This may be undesirable in an example because the processor was not taking advantage of the ownership of the lock and therefore is extending the processor's time of ownership. STEP 310 in an example therefore proceeds to STEP 314 and the wait_quantum 126 in an example is reduced so that on subsequent attempts to wait for a spinlock the processor will wait less time before re-checking the position in line.

Should the difference between ticket and serving values be greater than N at STEP 312, then the processor in an example proceeds to STEP 316. STEP 316 in an example increases the wait_quantum 126 so that in subsequent attempts to wait for a spinlock the processor will spend more time in the wait state before checking the queue again.

STEP 316 in an example exits an exemplary implementation of STEP 216 through STEP 320 to proceed to STEP 218 (FIG. 2). In another example, STEP 316 proceeds to STEP 304, for example, to repeat a waiting operation such as calculate the wait_time. The processor in an example upon a determination of premature attempt to acquire ownership of the access coordinator 128, locally determines an increased amount to delay a subsequent attempt to directly acquire ownership of the access coordinator 128. The delay for the attempt by the processor to directly acquire ownership of the access coordinator 128 in an example comprises a first delay portion and a second delay portion. The processor in an example upon completion of the first delay portion, locally determines that additional waiting is beneficial and makes a determination of the second delay portion. Upon completion of the second delay portion the processor in an example executes the later attempt to directly acquire ownership of the access coordinator 128.

STEP 218 in an example makes a determination whether the ticket difference is greater than or equal to N. For example, when the waiting in timed_preArbitration at STEP 306 has resulted in a ticket difference still greater than N to exit at STEP 320, STEP 218 in an example will proceed to STEP 220.

The processor in an example, potentially after completing timed_preArbitration at STEP 216 and exemplary regular preArbitration at STEP 220, proceeds to direct spinning at STEP 222. The processor compares the ticket value obtained at STEP 204 with the then-current serving value and, if these values match, acquires the spinlock and exits the spinlock algorithm. If the values do not match, the processor repeats the comparison until they do match.

The wait_quantum 126 in an example is adaptive. An exemplary implementation of logic through STEPS 314 and 316 comprises a mechanism and/or approach of self-adaptation to change the wait_quantum 126 over time, for example, to improve and/or produce better results. An exemplary implementation considers better results to cause subsequent occasions of the particular processor 108 or 110 executing and/or proceeding to the timed_preArbitration of STEP 302, to more often wait at STEP 306 for a desirable amount of time. The mechanism of adaptation in an example occurs on a per-processor basis, for example, to avoid additional bus traffic and/or to promote adaptation within a set of one or more tasks that may be associated with the particular process, for example, leading to access patterns different from other processors.

An exemplary wait_time at STEP 304 in an example comprises an amount of delay that most often causes the waiting processor to finish the wait STEP 306 at a time when the difference between ticket and serving values is between 1 and N, inclusive. An exemplary wait_time and therefore the optimal wait_quantum 126 in an example vary with the workload on the computing system as the apparatus 100. As the workload on the system changes, an exemplary desirable wait_quantum 126 may increase or decrease. The processor executing the logic flow at timed_preArbitration STEP 216 in an example modifies the wait_quantum 126 to adjust to the new workload. An exemplary self-adapting implementation may select an amount by which the wait_quantum 126 is increased or decreased and/or may select limits above which and below which the wait_quantum 126 cannot be incremented or decremented, respectively.

The scope of a variable in an example refers to the range of effect of the variable. For example, a variable may affect, be limited, and/or relate to one or more objects and/or components, one or more processors, one or more cells, one or more subsets of items of the apparatus 100, and/or the entire apparatus 100, for example, as global scope. An exemplary scope of a variable may be selected to fit the characteristics of the computing system as the apparatus 100. A narrow scope such as relating and/or matching one variable to one object and/or component in an example allows the variable to accurately describe the object and/or component but requires a larger amount of main memory, for example, one variable per object and/or component. For example, a narrow scope in an example relates and/or matches a variable to each lock 128, for example, one variable per lock 128. A wide scope such as relating and/or matching one variable to the entire apparatus 100 as global scope in an example reduces memory usage but does not provide a detailed and/or accurate relationship between the variable and the objects and/or components of the apparatus 100. An intermediate scope such as relating and/or matching one variable for each processor 108, 110 provides a compromise between memory usage and accuracy of the relationship between the variable and the objects and/or components being described. Additional exemplary intermediate scopes relate and/or match a variable to each cell 102, 104, thread, or process, for example, one variable per-cell 102, 104, per-thread, or per-process. One or more exemplary variables may serve in an implementation of the operating system 124 and/or be employable by the processors 108, 110 to control one or more exemplary algorithms and/or approaches such as timed_preArbitration at STEP 216, for example, on the locks 128.

The scope of the variable wait_quantum 126 and associated increment, decrement, minimum, and maximum values for the wait_quantum 126 in an example may be selected from narrow, intermediate, or wide scopes. An exemplary scope for the wait_quantum variable is the processor, for example, one wait_quantum variable per processor. For example, the wait_quantum 126 applies to the exemplary processor 108. An exemplary implementation that maintains a wait_quantum 126 per processor may reduce and/or minimize cache misses. In an exemplary implementation that employs a wait_quantum 126 per processor, a plurality, all, and/or substantially all of the locks 128 referenced by a processor may employ the same wait_quantum 126.

Figure 4:
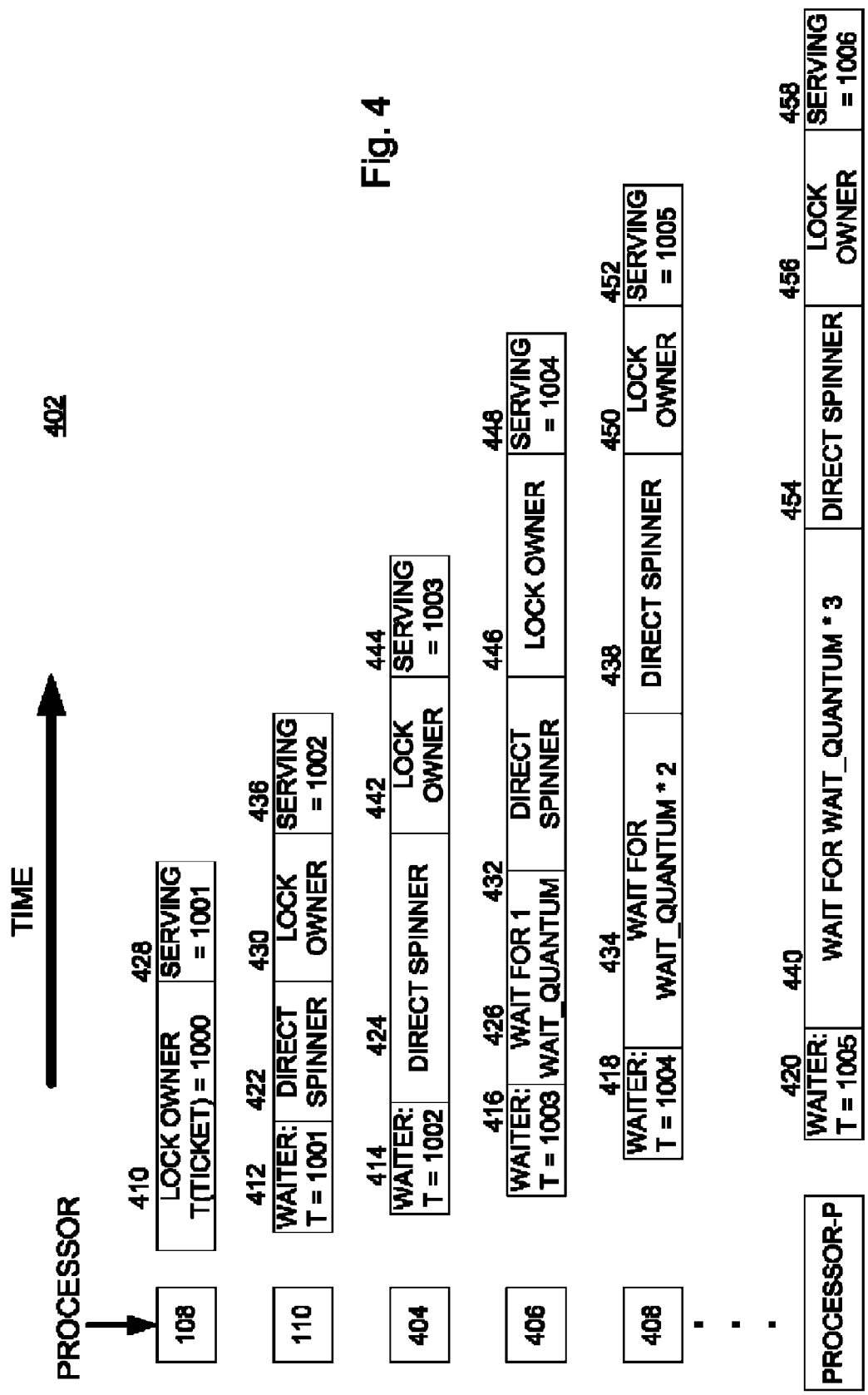
FIG. 4 is a representation of an exemplary state flow for an exemplary plurality of processors of an implementation of the apparatus of FIG. 1.

An illustrative description of an exemplary operation of an implementation of the computing system as the apparatus 100 is presented, for explanatory purposes. Turning to FIG. 4, an exemplary state flow 402 comprises an exemplary maximum number of two (2) as the selectable and/or configurable number N of direct spinners of the plurality of processors. The description herein is extendible and/or applies analogously to a number, variety, and/or ranges of exemplary maximum numbers of direct spinners and/or numbers of processors in a number, variety, and/or ranges of exemplary implementations of the apparatus 100, as will be appreciated by those skilled in the art. Exemplary numbers of direct spinners comprise 2, 3 or 4. Exemplary numbers of processors comprise 32 through 2048.

The plurality of processors of the computing system as the apparatus 100 in an example comprises a number up to a selectable and/or configurable number P, for example, processors 108, 110, 404, 406, 408, . . . , $PROCESSOR_P$ of an exemplary implementation of the apparatus 100.

At STATE 410, processor 108 in an example is the owner of an exemplary lock 128 having previously acquired ticket number 1000 at an initial state, at which the value of serving was also 1000, as will be appreciated by those skilled in the art. At STATES 412, 414, 416, 418, 420 in an example processors 110, 404, 406, 408, $PROCESSOR_P$ in an example attempt to acquire the same lock 128 and therefore acquire tickets 1001, 1002, 1003, 1004, and 1005, respectively.

Referring to FIGS. 2 through 4, processor 110 in an example at STATE 412 performs STEP 212 by comparing its ticket number (1001) to the serving value (1000) and proceeding to become a direct spinner at STATE 422 because the difference between ticket and serving (1) is not greater than or equal to N (e.g., 2). Processor 404 in an example at STATE 414 performs STEP 212 by comparing its ticket number (1002) to the serving value (1000) and proceeding to STEP 214 because the difference between ticket and serving is equal to N (e.g., 2). The processor 404 in an example then determines that the difference is not greater than N (e.g., 2) and so proceeds to STEP 218. The processor 404 in an example branches to preArbitration STEP 220. Processor 404 in an example then proceeds to direct spinning at STATE 424.

Processor 406 in an example compares its ticket number (1003) to the serving value (1000) and proceeds to STEPS 212 and 214 because the difference (3) is greater than N (e.g., 2). At STEP 214 in an example processor 406 branches to timed_preArbitration STEP 216. The processor 406 at STEP 304 in an example determines the wait_time to be 1* wait_quantum 126. The processor 406 in an example then waits for this amount of time at STEP 306 and STATE 426. After waiting for the wait_quantum 126, the processor 406 at STEP 308 in an example determines the new difference between ticket and serving. While the processor 406 was waiting, the processor 108 in an example released the lock 128 and incremented the serving value to 1001 at STATE 428. Therefore, when the processor 406 in an example recalculates the difference between ticket and serving, the difference at STATE 432 is 2. Processor 406 in an example then proceeds from STEP 310 to STEP 312 and STEP 318, exiting STEP 216 to become a direct spinner.

Processor 110 in an example while spinning directly on the spinlock at STATE 422, detects at STEP 222 that processor 108 has incremented the serving value to 1001 at STATE 428. When processor 110 in an example detects this change in the state of the spinlock, the processor 110 exits the direct spinning STATE 422 and becomes the new owner of the spinlock at STATE 430.

Processor 408 in an example takes ticket 1004 at STATE 418 before processor 108 has released the lock 128 at STATE 428. The processor 408 at STEP 210 in an example calculates the difference between ticket and serving to be 4. Processor 408 in an example then branches to timed_preArbitration STEP 216. The processor 408 in an example calculates the wait_time at STEP 304 to be 2 times the wait_quantum 126. Therefore, at STATE 434 the processor 408 in an example waits twice as long as processor 406 waited at STATE 426. At the end of the wait by the processor 408, the processor 108 in an example has incremented the serving value to 1001 and the processor 110 has further incremented the serving value to 1002 at STATE 436. The processor 408 at STATE 438 in an example calculates 2 to be the new difference between ticket and serving. The processor 408 in an example determines that the difference 2 is equal to N (e.g., 2) and proceeds to direct spinning.

PROCESSOR$_P$ in an example takes ticket 1005 at STATE 420 before processor 108 has released the lock 128. PROCESSOR$_P$ in an example calculates the difference between ticket and serving to be 5. PROCESSOR$_P$ in an example calculates the wait_time at STEP 304 to be 3 times the wait_quantum 126. At STATE 440 PROCESSOR$_P$ waits 3 times the wait_quantum 126. At the end of that wait time in an example the serving value has been incremented to 1003. Therefore, the difference between ticket and serving is 2, equal to N (e.g., 2), so PROCESSOR$_P$ also becomes a direct spinner.

Processors 404, 406, 408 and PROCESSOR$_P$ in an example each become owners of the spinlock at STATES 442, 446, 450 and 456, respectively, in response to the previous owner of the spinlock releasing the lock and incrementing the serving value in an analogous manner to the way that processor 108 released the lock at STATE 428 and processor 110 became the owner of the lock at STATE 430. Processors 110, 404, 406, 408 and PROCESSOR$_P$ in an example each release the spinlock and increment the serving value at STATES 436, 444, 448, 452 and 458 in an analogous manner to the way processor 108 released the lock at STATE 428.

An exemplary implementation employs a selectable and/or configurable number N of direct spinners for a spinlock as an exemplary lock 128. More than one processor may spin directly on the lock. With n-direct-spinners, a configurable number of waiters for a spinlock may be allowed to spin directly on the lock. Additional waiters may be routed to pre-arbitration. An exemplary benefit is a heavily-contended lock will always have a processor ready to take the lock as soon as the lock becomes available. An exemplary implementation employs timed-prearbitration for a significant performance win.

An exemplary implementation employs timed prearbitration as an exemplary strategy for delaying processors waiting for a highly-contended spinlock as an exemplary lock 128 for a certain amount of time before the processors actively spin on the spinlock. The processors in an example avoid cache misses that may occur if the processors contend directly on the spinlock. The processors in an example may avoid being routed to the pre-arbitration algorithm, procedure, program, mechanism, application, code, and/or logic completely. Exemplary timed prearbitration in an example employs a ticket-serving mechanism to adaptively and/or heuristically determine an appropriate amount of time for a processor to delay before contending for the spinlock. The amount of time the processor spends in delay may be proportional to a distance to the front of the line of waiting processors, as may be determined by the difference between the ticket and the serving values.

After the processor delays for a while in an example the processor rechecks the ticket and serving values and determines if the processor should go into pre-arbitration or spin directly on the spinlock. If the time spent in delay is desirable and/or acceptable, the processor in an example may often, typically, and/or usually find that spinning directly on the lock is appropriate, thus avoiding the trip to pre-arbitration and the cache misses that may occur there. An exemplary interaction with an exemplary n-direct-spinners technique allows multiple direct spinners to give the waiting processor more latitude to decide that the processor should spin directly on the lock. Exemplary n-direct-spinners together with timed-prearbitration in an example combine to make a significant reduction in cache misses during lock acquisition.

An exemplary implementation employs adjustment and/or adaptation of the delay quantum 126, for example, dynamically, to fit an observed behavior of the computing system as the apparatus 100. For example, statistics are collected to track whether the quantum 126 currently in use caused the delayed processor to be early, late, or just right with regard to lock availability when the delay is finished. If the processor finishes the delay loop early, then the processor in an example enters the pre-arbitration algorithm, procedure, program, mechanism, application, code, and/or logic. In an example in connection with this case, the delay quantum 126 is increased. If the processor is late in an example then the processor discovers that the lock became available, so the processor became the owner while the processor was in the delay loop. In an example in connection with this case, the quantum 126 is decreased. Otherwise in an example the processor finds that the processor delayed just enough to be at or near the front of the line and no adjustment to the quantum 126 is made.

An exemplary implementation employs a self-tuning algorithm, procedure, program, mechanism, application, code, and/or logic enables a computing system as the apparatus 100 to wring out as many extraneous cache misses as possible in spinlock synchronization algorithm, procedure, program, mechanism, application, code, and/or logic. An exemplary implementation is located at the heart of the operating system and thus impacts how all system processes and customer applications perform. An exemplary resulting performance boost enables large multi-processor computing systems to achieve ever higher throughput levels in industry standard benchmarks and customer applications. Additional system performance in an example equates directly to higher value to the customer, which is reflected in the price they are willing to pay for the system.

An exemplary implementation comprises a processor 108, 110 that upon a failure of an earlier attempt to directly acquire ownership of an access coordinator 128 for a resource 130 shared with one or more additional processors 108, 110, locally determines an amount to delay a later attempt to directly acquire ownership of the access coordinator 128. Upon a failure of the later and/or a subsequent attempt to directly acquire ownership of the access coordinator 128 the processor 108, 110 would enter into an indirect waiting arrangement for ownership of the access coordinator 128.

The processor 108, 110, upon the failure of the earlier attempt to directly acquire ownership of the access coordinator 128, locally determines the amount to delay the later attempt to directly acquire ownership of the access coordinator 128. Upon an occurrence of the failure of the later attempt to directly acquire ownership of the access coordinator 128 the processor 108, 110 would enter into the indirect waiting arrangement for ownership of the access coordinator 128. The processor 108, 110, upon the failure of the later attempt to directly acquire ownership of the access coordinator 128, locally determines an amount to delay the subsequent attempt to directly acquire ownership of the access coordinator 128. Upon an occurrence of the failure of the subsequent attempt to directly acquire ownership of the access coordinator 128 the processor 108, 110 would enter into the indirect waiting arrangement for ownership of the access coordinator 128.

The access coordinator 128 for the resource 130 comprises one or more spinlocks 128 and/or one or more blocking locks 128 on the resource 130. A plurality of processors 108, 110 comprises the processor 108, 110 and the one or more additional processors 108, 110. The plurality of processors 108, 110 operates under a modified ticket-serving with prearbitration arrangement. The processor 108, 110 locally determines the amount to delay the later attempt to directly acquire ownership of the access coordinator 128 through employment of a proportional relationship between the amount and a difference between ticket and serving values for the processor 108, 110 on the access coordinator 128 under the modified ticket-serving with prearbitration arrangement. The access coordinator 128 for the resource 130 comprises a single spinlock 128 on the resource 130.

The processor 108, 110, upon success of the later attempt to directly acquire ownership of the access coordinator 128 avoids one or more cache misses that would be associated with an occurrence of entry of the processor 108, 110 into the indirect waiting arrangement for ownership of the access coordinator 128. The indirect waiting arrangement for ownership of the access coordinator 128 comprises prearbitration for ownership of the access coordinator 128. The processor 108, 110, upon success of the later attempt to directly acquire ownership of the access coordinator 128 avoids one or more cache misses that would be associated with an occurrence of entry of the processor 108, 110 into the prearbitration for ownership of the access coordinator 128. The processor 108, 110 heuristically determines the amount to delay the later attempt to directly acquire ownership of the access coordinator 128.

An exemplary implementation comprises a processor 108, 110 that locally determines an amount of delay for an attempt by the processor 108, 110 to directly acquire ownership of an access coordinator 128 for a resource 130 shared with one or more additional processors 108, 110. Upon a completion of the amount of delay the processor 108, 110 adjusts a heuristic based on an occurrence of success or failure of the attempt to directly acquire ownership of the access coordinator 128, to adapt a later attempt by the processor 108, 110 to directly acquire ownership of the access coordinator 128.

The processor 108, 110, upon an occurrence of the later attempt to acquire the ownership of the access coordinator 128, locally determines a different amount to delay a subsequent attempt to directly acquire ownership of the access coordinator 128. The processor 108, 110 employs the heuristic to locally determine the different amount to delay the subsequent attempt to directly acquire ownership of the access coordinator 128. The processor 108, 110, upon a determination of unnecessary duration of preliminary ownership of the access coordinator 128, locally determines a reduced amount to delay a subsequent attempt to directly acquire ownership of the access coordinator 128.

The processor 108, 110, upon a determination of premature attempt to acquire ownership of the access coordinator 128, locally determines an increased amount to delay a subsequent attempt to directly acquire ownership of the access coordinator 128. The delay for the attempt by the processor 108, 110 to directly acquire ownership of the access coordinator 128 comprises a first delay portion and a second delay portion. The processor 108, 110, upon completion of the first delay portion, locally determines that additional waiting is beneficial and makes a determination of the second delay portion. Upon completion of the second delay portion the processor 108, 110 executes the later attempt to directly acquire ownership of the access coordinator 128.

One or more attempts by the processor 108, 110 to directly acquire ownership of the access coordinator 128 comprise the attempt by the processor 108, 110 to directly acquire ownership of the access coordinator 128. Upon an occurrence of failure of the one or more attempts to directly acquire ownership of the access coordinator 128, the processor 108, 110 would enter into an indirect waiting arrangement for ownership of the access coordinator 128. The access coordinator 128 for the resource 130 comprises one or more spinlocks 128, one or more read/write spinlocks 128, one or more blocking locks 128, one or more read/write blocking locks 128, one or more adaptive locks 128, one or more mutexes 128, one or more condition variables 128, and/or one or more semaphores 128 on the resource 130.

An exemplary implementation comprises a computer operating system 124 that coordinates ownership of a spinlock 128 for a resource 130 shared among a plurality of processors. Upon an occurrence of owned status of the spinlock 128 contemporaneous with a request for ownership of the spinlock 128 by a plural set of processors 108, 110 of the plurality of processors 108, 110, the computer operating system 124 allows a plural subset number of processors 108, 110 of the plural set of processors 108, 110 to directly wait for ownership of the spinlock 128. The computer operating system 124 causes one or more additional processors 108, 110 of the plural set of processors 108, 110 in excess of the plural subset number of processors 108, 110, to indirectly wait for ownership of the spinlock 128.

Upon an occurrence of owned status of the spinlock 128 contemporaneous with a request for ownership of the spinlock 128 by a single processor 108, 110 of the plurality of processors 108, 110, the computer operating system 124 allows the single processor 108, 110 to directly wait for ownership of the spinlock 128. The plural subset number of processors 108, 110 comprises the single processor 108, 110 and multiple processors 108, 110. Upon an occurrence of owned status of the spinlock 128 contemporaneous with the single processor 108, 110 directly waiting for ownership of the spinlock 128 and a request for ownership of the spinlock 128 by the multiple processors 108, 110 and the one or more additional processors 108, 110 of the plural set of processors 108, 110, the computer operating system 124 allows the single processor 108, 110 and the multiple processors 108, 110 to directly wait for ownership of the spinlock 128 and causes the one or more additional processors 108, 110 to indirectly wait for ownership of the spinlock 128.

An implementation of the apparatus 100 in an example comprises a plurality of components such as one or more of electronic components, mechanical components, hardware components, and/or computer software components. A number of such components can be combined or divided in an implementation of the apparatus 100. An exemplary component of an implementation of the apparatus 100 employs and/or comprises a set and/or series of computer instructions written in or implemented with any of a number of programming languages, as will be appreciated by those skilled in the art.

An implementation of the apparatus 100 in an example encompasses an article. The article comprises one or more computer-readable signal-bearing media. The article comprises means in the one or more media for one or more exemplary and/or desirable functions, approaches, and/or procedures.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises the recordable data storage medium of the one or more memory locations and/or fabrics, for example, the memory fabric 106, the caches 112, 114, and/or the main memories 116, 118. A computer-readable signal-bearing medium for an implementation of the apparatus 100 in an example comprises one or more of a magnetic, electrical, optical, biological, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a first processor that upon a failure of an earlier attempt to directly acquire ownership of an access coordinator for a resource shared with one or more additional processors, is configured to locally determine an amount to delay a later attempt to directly acquire ownership of the access coordinator,
wherein upon a failure of the later and/or a subsequent attempt to directly acquire ownership of the access coordinator, the first processor is configured to enter into an indirect waiting arrangement for ownership of the access coordinator, wherein the indirect waiting arrangement for ownership of the access coordinator involves organizing the first and the one or more additional processors waiting for ownership of the access coordinator to access separate structures to avoid interference between or among the first and the one or more additional processors.

2. The apparatus of claim 1, wherein the first processor, upon the failure of the later attempt to directly acquire ownership of the access coordinator, is configured to locally determine an amount to delay the subsequent attempt after the later attempt to directly acquire ownership of the access coordinator, wherein upon an occurrence of the failure of the subsequent attempt to directly acquire ownership of the access coordinator, the first processor is configured to enter into the indirect waiting arrangement for ownership of the access coordinator.

3. The apparatus of claim 1, wherein the access coordinator for the resource comprises one or more spinlocks and/or one or more blocking locks on the resource.

4. The apparatus of claim 1, wherein a plurality of processors comprise the first processor and the one or more additional processors, wherein the first processor is configured to locally determine the amount to delay the later attempt to directly acquire ownership of the access coordinator through employment of a proportional relationship between the amount and a quantity that represents how far back in line the first processor is among the plurality of processors waiting for the access coordinator.

5. The apparatus of claim 1, wherein the access coordinator for the resource comprises a single spinlock on the resource.

6. The apparatus of claim 1, wherein the first processor, upon success of the later attempt to directly acquire ownership of the access coordinator, avoids one or more cache misses that would be associated with an occurrence of entry of the first processor into the indirect waiting arrangement for ownership of the access coordinator.

7. The apparatus of claim 4, wherein the amount to delay the later attempt is based on multiplying the quantity with a parameter that represents a configurable wait time, wherein that the processor is configured to further adjust a value of the parameter based on a detected condition.

8. The apparatus of claim 7, wherein the value of the parameter is increased in response to detecting that the later attempt results in the quantity being greater than a threshold, and wherein the quantity is decreased in response to detecting that the later attempt results in another value of the quantity.

9. The apparatus of claim 8, wherein the another value of the quantity indicates that the first processor is an owner of the access coordinator.

10. The apparatus of claim 6, wherein the indirect waiting arrangement for ownership of the access coordinator comprises prearbitration for ownership of the access coordinator, wherein the separate structures include separate cache lines, and wherein the prearbitration involves organizing the first and the one or more additional processors to access the separate cache lines to avoid interference.

11. The apparatus of claim 1, wherein the first processor is configured to heuristically determine the amount to delay the later attempt to directly acquire ownership of the access coordinator.

12. An apparatus, comprising:
a first processor configured to locally determine an amount of delay for a later attempt by the first processor to directly acquire ownership of an access coordinator for a resource shared with one or more additional processors, wherein upon a completion of the amount of delay the first processor is configured to adjust a heuristic based on an occurrence of success or failure of the attempt to directly acquire ownership of the access coordinator, wherein the adjusted heuristic is to adapt a subsequent attempt by the first processor to directly acquire ownership of the access coordinator, wherein the adjusted heuristic comprises an adjusted delay time that controls an amount of delay that the first processor is to wait to make the subsequent attempt after the later attempt to directly acquire ownership of the access coordinator, in response to the first processor failing to acquire ownership of the access coordinator in the later attempt, and wherein adjusting the heuristic comprises:
in response to determining that the first processor is an owner of the access coordinator upon the completion of the amount of delay for the later attempt, reduce the heuristic to reduce the adjusted delay time, and
in response to determining that the first processor is behind greater than a predetermined number of other processors waiting for the access coordinator upon the completion of the amount of delay for the later attempt, increase the heuristic to increase the adjusted delay time.

13. The apparatus of claim 12, wherein the first processor, upon an occurrence of the later attempt to acquire the ownership of the access coordinator, is configured to locally determine a different amount to delay the subsequent attempt to directly acquire ownership of the access coordinator.

14. The apparatus of claim 13, wherein the first processor is configured to employ the heuristic to locally determine the different amount to delay the subsequent attempt to directly acquire ownership of the access coordinator.

15. The apparatus of claim 12, wherein the delay for the later attempt by the first processor to directly acquire ownership of the access coordinator comprises a first delay portion and a second delay portion;

wherein the first processor, upon completion of the first delay portion, is configured to locally determine that additional waiting should be performed and to make a determination of the second delay portion, wherein upon completion of the second delay portion the first processor is configured to execute the later attempt to directly acquire ownership of the access coordinator.

16. The apparatus of claim 12, wherein upon an occurrence of failure of the later attempt to directly acquire ownership of the access coordinator, the first processor is configured to enter into an indirect waiting arrangement for ownership of the access coordinator, wherein the indirect waiting arrangement for ownership of the access coordinator involves organizing the first and the one or more additional processors waiting for ownership of the access coordinator to access separate structures to avoid interference between or among the first and one or more additional processors.

17. The apparatus of claim 16, wherein the indirect waiting arrangement for ownership of the access coordinator comprises prearbitration for ownership of the access coordinator, wherein the separate structures include separate cache lines, and wherein the prearbitration involves organizing the first and the one or more additional processors to access the separate cache lines to avoid interference.

18. The apparatus of claim 12, wherein the access coordinator for the resource comprises a member selected from the group consisting of one or more spinlocks, one or more read/write spinlocks, one or more blocking locks, one or more read/write blocking locks, one or more adaptive locks, one or more mutexes, one or more condition variables, and one or more semaphores on the resource.

19. The apparatus of claim 12, wherein adjusting the heuristic further comprises:
in response to determining that the first processor is not an owner of the access coordinator and that the first processor is behind less than or equal to the predetermined number of the other processors waiting for the access coordinator upon the completion of the amount of delay for the later attempt, leaving the heuristic unchanged.

20. An apparatus, comprising:
a plurality of processors; and
a computer operating system to coordinate ownership of a spinlock for a resource shared among the plurality of processors;
wherein upon an occurrence of owned status of the spinlock contemporaneous with a request for ownership of the spinlock by a plural set of processors of the plurality of processors, the computer operating system is configured to allow a plural subset of processors of the plural set of processors to directly wait for ownership of the spinlock;
wherein the computer operating system is configured to cause additional processors of the plural set of processors in excess of the plural subset of processors, to indirectly wait for ownership of the spinlock, wherein indirect waiting for ownership of the spinlock comprises causing the additional processors waiting for ownership of the access coordinator to access separate structures to avoid interference between or among the additional processors.

21. The apparatus of claim 20, wherein upon an occurrence of owned status of the spinlock contemporaneous with a request for ownership of the spinlock by a single processor of the plurality of processors, the computer operating system is configured to allow the single processor to directly wait for ownership of the spinlock.

22. The apparatus of claim 21, wherein the plural subset of processors comprises the single processor and multiple processors, wherein upon an occurrence of owned status of the spinlock contemporaneous with the single processor directly waiting for ownership of the spinlock and a request for ownership of the spinlock by the multiple processors and the additional processors of the plural set of processors, the computer operating system is configured to allow the single processor and the multiple processors to directly wait for ownership of the spinlock and to cause the additional processors to indirectly wait for ownership of the spinlock.

23. The apparatus of claim 20, wherein indirect waiting for ownership of the spinlock comprises prearbitration for ownership of the spinlock, wherein the separate structures include separate cache lines, and wherein the prearbitration involves organizing the additional processors to access the separate cache lines to avoid interference.

* * * * *